Oct. 7, 1958 S. POLKI 2,854,778
FISHING LURE
Filed Nov. 9, 1956
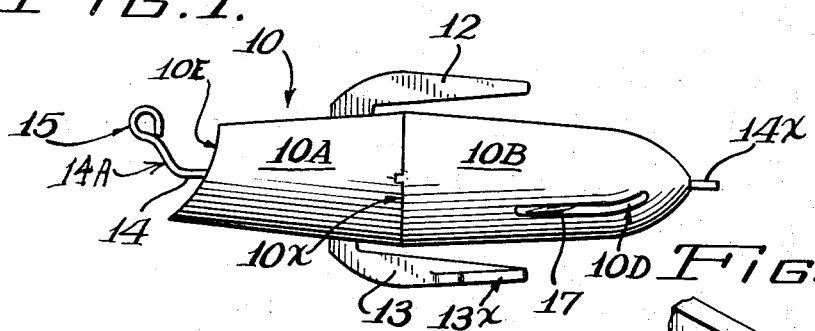
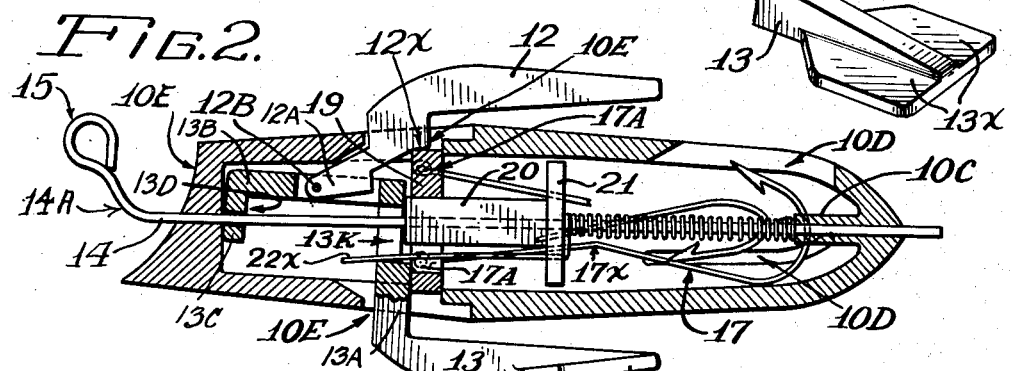
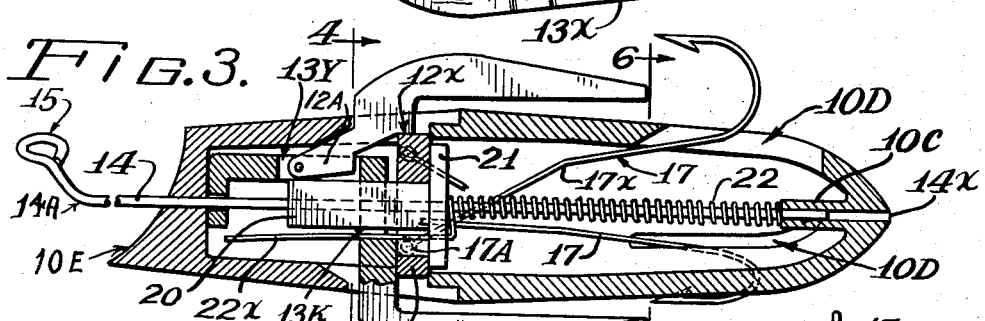
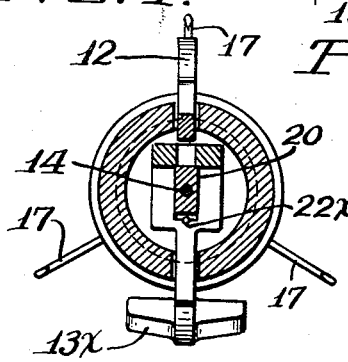
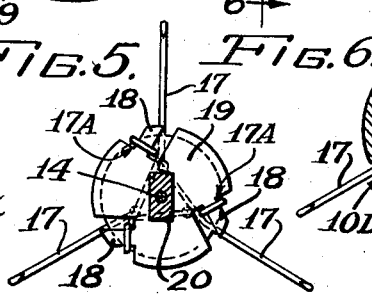
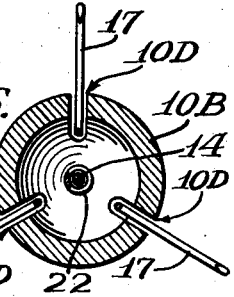
Inventor:
Samuel Polki
By [signature] Atty.

United States Patent Office 2,854,778
Patented Oct. 7, 1958

2,854,778

FISHING LURE

Samuel Polki, Forest Park, Ill., assignor to Carl Liljegren, Chicago, Ill.

Application November 9, 1956, Serial No. 621,401

9 Claims. (Cl. 43—35)

This invention pertains to fishing lures of the type having triggered and concealed hooks, and has as its principal object the provision of improvements in the hook-actuating, and trigger means affording a practical and economical construction with dual trigger fins, positively retracting and extending hook means, and a molded trigger and hook-camming means which can be set or cocked by pushing in the leader eye or shackle, the construction all being contrived to maintain the conventional appearance of the ordinary type of fishing plug.

Another feature of novelty is the provision of an angled leader eye or shackle rod which is angularly adjustable, in conjunction with a water foil formation on the head of the lure, to change the motion or animation pattern thereof.

More specific objects and aspects of novelty and utility relate to details of the construction and operation of the commercial embodiment illustrated and described hereinafter in view of the annexed drawings, in which:

Fig. 1 is a side elevation of the plug with hook retracted;

Fig. 2 is a longitudinal vertical section to enlarged scale;

Fig. 3 is a longitudinal section similar ot Fig. 2 but with the hooks triggered or sprung out;

Fig. 4 is a transverse section taken along lines 4—4 of Fig. 3;

Fig. 5 is a rear elevational view of the plug with hooks sprung out;

Fig. 6 is a front elevation with the hooks sprung out;

Fig. 7 is an enlarged fragmentary perspective detail of the trigger-stabilizing fin.

One form of the novel plug is depicted in Fig. 1 and comprises a plug body 10 consisting of a front section 10A and a rear section 10B joined, as by a suitable cement, along a junction line 10X.

The two sections are preferably formed as molded plastic shells, both affording internal cavities, as in the sectional view of Fig. 2.

The plug, as viewed in Fig. 1, is completed by the provision of a pair of rockable trigger fins 12 and 13 situated at the upper and lower sides of the plug, the head of the latter being dished as at 10E.

An elongated cocking and leader rod 14 traverses the length of the plug and is slidable lengthwise thereof, the forward end of the rod being formed into an eye 15, while the opposite end portion 14X thereof projects slidably from the tail of the plug, and the eye-shackle portion is angled laterally as at 14A.

A set of three inwardly-nesting, spring-released hooks 17 is fitted into the rearward shell portion 10B (Fig. 2), each hook having an eye portion 17A freely fitted into a chordally-extending pivot lug 18 (Fig. 5) molded as a part of a carrier disc 19 fitted upon a sliding trigger projection 20 of rectangular cross section (as in Figs. 3 and 5), said disc being part of a hook-camming or actuating disc 21 slidably carried on the rod 14.

A compression spring 22 on the cocking rod 14 acts between the cam disc 21 and a rear bearing nipple 10C formed as part of the plug shell to urge the cam disc toward the left (Fig. 3) into the normally tripped-out or triggered condition there shown in which the several hooks are sprung-out through appertaining slots 10D in the wall of the rearward shell section.

Each hook shank has an offsetting bend, as at 17X (Fig. 3), by reason of which the shank portion between the eye and the bend or inflection extends in a chordal sense from the appertaining pivot lug 18 across the diameter of the carrier disc 19, and the remaining shank portion from the point of inflection to the hook proper lies along a line which is radial to the center of said disc 19 (as in Fig. 5), the rod 14 being at the center of the disc or circle relative to which said chordal and radial hook portions are defined.

The camming disc 21 (Figs. 2, 3) is rigidly attached to, and preferably integrally molded with, the trigger key 20, and is provided with three enlarged holes 23 through each of which passes the chordally-extending portion of one of the hook shanks, with the result that reciprocatory movement of said actuating disc 21, between the limiting positions thereof shown in Figs. 2 and 3, will pivot the hooks into and out of the fully exposed and fully nested condition depicted in those views.

The spring 22, however, normally urges the camming disc 21 into the released condition shown in Fig. 2 with the hooks exposed.

Trigger means for releasably retaining the actuating means, including the spring 22 and camming disc 21, in a cocked condition, comprises the slidable key member 20 and the two trigger fins 12 and 13, the latter, as viewed in Fig. 2, being of somewhat Z-shape, the exposed fin portion 13 being joined by a cross bar 13A to a rocker bar portion 13B having a pendant finger portion 13C provided with an over-size hole 13D rockably seating on the rod 14, while the cross-bar portion 13A has a square slot or keyway 13K into which the trigger key 20 on the camming disc can freely enter (as in Fig. 3).

The upper trigger fin 12 has an extension 12A freely entering a cut-out 13Y in the rocker finger portion of the lower fin, said upper fin extension being pivotally attached, as by pin means 12B, to said rocker finger of the lower fin, so that the upper trigger fin 12 is pivotally carried by the lower trigger fin 13, both internally located portions of said fins entering the plug shell through molded slots 10E in the head section thereof.

The pivotally attached part of the upper fin is provided with a fulcrum ledge formation 12X which overlies, and can bear against, the upper edge of the hook carrier disc 19, with the result that upon application of a thrust on fin 12 acting toward the plug, the pivoted portion is rocked upwardly about fulcrum 12X, thereby lifting the lower fin from the cocked position of Fig. 2 to the released condition of Fig. 3 wherein the keyway 13K is aligned with the key extension 20 so that spring 22 can drive the latter into the keyway along with the camming disc 21, thus springing the hooks outwardly into effective exposure.

Means for biasing the trigger mechanism to block the key member 20 includes a long extension 22X from the near end of the compression spring, said extension traversing the camming disc and the hook carrier disc to bear downwardly upon the lower fin 13 thereby tending to pivot same outwardly of the plug (as in Fig. 2) and also to pivot the upper fin similarly through the pivot connection 12B.

Three hooks are provided at equidistant points about the plug, and in order to stabilize the latter so that the two trigger fins will generally lie in a vertical plane as the plug is pulled through the water, the lower fin is provided with an enlarged planing surface as at 13X (Figs. 4 and 7).

In the operation of the plug the usual leader (not shown) is attached to the eye 15 and the plug is armed or cocked by pushing in on said eye until the key projection 20 on the camming disc has cleared the keyway 13K so that the long spring member 22X can rock the lower fin 13 to disalign said keyway and block the key projection in the cocked condition of Fig. 2.

The plug may be used in any of the customary manners, inclusive of trolling and casting, and while either trigger fin 12 or 13 will release the hooks, the fin 13 is made slightly different in releasing action owing to the relative leverages and location of the several fulcrum points represented by the point of engagement of the spring extension 22X with the lower fin, and the fulcrum 12X and the pivot 12B, the purpose being to provide a differential in sensitivity to compensate for the presence of the added planing surface or web 13X on the lower fin, it being necessary to prevent premature triggering when said planing fin 13X strikes the water flat and hard in casting the plug.

If inward triggering pressure is applied directly to the planing fin itself it will first yield and touch the plug body and the releasing action will follow upon continued application of the inward pressure at a point close to the leading margin of this fin, that is the margin thereof closest to the body slot 10E.

The great majority of strikes will involve both trigger fins, although either one will release the hooks.

While numerous fishing lures armed with various arrangements of concealed and spring hooks have been proposed heretofore, the disclosed construction is practical for manufacturing purposes and affords a plug of generally conventional character in appearance, size, weight, and performance in the water, with simple, safe, and consistent performance in the operation and sensitivity of its cocking and triggering mechanisms; and particular advantage is claimed for the arming operation of the leader rod and the latching and triggering structure and action of the fins and hook camming member 20—21.

The rod 14 has a tight press-fit with the key member 20 so as to turn hard therein but resist longitudinal slippage, by reason of which the lure may be caused to move through the water in a variety of manners by simply twisting the shackle eye portion 14A—15 to any of a plurality of positions from the normal position shown in Figs. 1 and 2 to that shown in Fig. 3, for example; and this adjustment accordingly throws the eye 15 off position relative to the water foil or cut-water 10E, to vary the animation effects, simulating crippled prey.

I claim:

1. In a trigger type fishing plug: a hollow plug body and means therein including, hook-projecting and trigger means comprising a hook-camming disc having a keyed axially projecting extension; a setting rod extending longitudinally through the plug body and slidable lengthwise thereof, said rod extending through said keyed extension and disc; spring means normally acting upon said disc to urge the same and said extension forwardly of the plug; hook means pivotally mounted at one end on a fixed hook-carrying member within said body such that said hook means can pivot in a generally transverse sense of the rod from a retracted position within said body to a projecting condition outwardly of the body, each hook having a shank portion freely fitting in a cam slot in said camming disc, reciprocable motion of the latter camming the hooks inwardly and outwardly of the body according to the forward or rearward direction of movement of the disc; and trigger means for the camming disc including a rockable member having a portion within the plug body freely traversed by said rod and a fin portion projecting outwardly of the body, together with a keyway into which said keyed portion of the camming disc can pass under urgence of said spring means, said rockable member being rockable into a set position in which said keyway is out of alignment with said keyed portion and blocks the latter from spring-urged movement, pressure on said fin toward said plug rocking the trigger member to align the keyway and release the camming disc to spring the hooks.

2. The construction set forth in claim 1, further characterized in that a second trigger fin in pivotally carried by said rockable member to project outwardly from an opposite side of the plug body from the first fin, said second fin bearing against a stationary fulcrum part in said body when pressed inwardly toward the plug whereby to rock the trigger member into alignment for the purpose aforesaid.

3. A lure of the class described comprising a hollow lure body having opposite fin passages and a set of hook passages through its side walls; a combination cocking and shackle rod slidably traversing said body lengthwise thereof, a first trigger fin having a bar entering one of said passages in a direction laterally of the lure body and an offset rocker extension directed longitudinally and forwardly within said body and rockably engaging said rod, and an offset trigger-fin portion at the opposite end of said bar outside said body and extending rearwardly and longitudinally thereof; hook means pivoted within said body for retraction and projection through said hook passages; cam means mounted concentrically of said bar and coacting with said hook means when moved rearwardly to retract the latter and when moved forwardly to project the same; spring means normally urging said cam means forwardly; spring means normally rocking said first trigger fin laterally of said rod and outwardly of said body to a cocked position; a keyway formed in part of said bar; a key member operably connected with said cam means movable forwardly through said keyway when the latter is aligned therewith in the released position of said first fin, and jamming with a portion of said bar by misalignment with the keyway when the first trigger fin is in cocked position as aforesaid, such that slight movement of the trigger fin inwardly of the lure body from cocked position will align the said keyway and key member and permit said spring means to move the cam means forwardly to spring said hook means outwardly to effective position.

4. The construction of claim 3 further characterized by the provision of a second trigger fin having a portion exposed outside of said body and a portion entering the body through one of said trigger passages and pivotally supported on a part of said first trigger fin, with a further fulcrum portion engageable with a stationary surface inside the body to rock the first trigger fin out of cocked position responsive to slight pressure on the second fin toward said body at a time when the second trigger fin is in cocked condition.

5. In a fishing lure of the type having movable hook means spring-urged from retracted condition within the lure to effective position outside the same, improvements in trigger mechanism comprising: a driving member cooperable with said hook means to move the same inwardly and outwardly of the lure; spring means urging said driving member to move the hook means outwardly as aforesaid; a key formation movable with said driving member; a first trigger fin having a portion rockably mounted inside said lure adjacent said key formation, and a fin portion projecting outwardly of the lure; said inside portion of the trigger fin having a keyway alignable with said key formation to permit spring-movement of the driving member to move the hook means from cocked, retracted condition to outwardly-projected effective position; spring means urging said trigger fin outwardly of the lure to a cocked position condition in which said keyway is rocked out of alignment with the key formation when the driving member is moved into cocked condition, whereby to maintain said latter condition until the trigger fin is moved inwardly of the lure an amount sufficient to align said keyway and key formation and free the driving member for spring projection of the hook means as aforesaid; and cocking means including a portion exposed on the outside of the lure for movement to move said driving member to said cocked condition.

6. In a fishing lure having spring-driven hook means movable upon release from cocked condition responsive to actuation of a trigger, improvements in a trigger mechanism comprising, namely: two movable trigger arms having inside projections within the lure and each having a trigger projection outside of the lure, the inside projection of one arm being rockably mounted inside the lure, and the inside projection of the other said arm being rockably mounted on the inside projection of the first-mentioned arm and acting upon an inside fulcrum point in the lure such that pressure upon the fins jointly or singly in a certain direction will rock the inside projection of a certain one of the same in a certain releasing direction; and further triggering means cooperable with spring-driven hook means, as aforesaid, and cooperable with said certain inside projection to hold the hook means in cocked condition and to release the same from cocked condition responsive to movement of said certain inside projection in the certain direction aforesaid.

7. In a trigger mechanism for fishing lures having spring-driven hooks, two trigger members a first one of which is rockably mounted on a slidable member carried by the lure, and the second one of which is pivoted on the first member and also bears on a fixed fulcrum point inside the lure such that the two triggers may be rocked toward each other simultaneously or separately to cause a rocking trigger movement of that one of them which is mounted on the slidable member to a predetermined trigger-release position, and spring-driven hook means in the lure operably controlled for movement from a cocked condition to a released condition of said rocking trigger movement.

8. In a trigger-actuated fishing lure, trigger means comprising a pair of fin projections, one on each side of the lure and each having an inner end entering the lure, a first one of said trigger ends being pivoted on the end of the second trigger and the end of the second trigger being rockably mounted on means interior of the lure, such that said second trigger can be rockably displaced in a certain direction when the exterior portion thereof is pressed toward the lure, the trigger appertaining to said first end engaging a fixed part in the lure when said trigger member is pressed toward the lure whereby to displace the end of the second trigger in said certain direction; and trigger-release means actuated by the aforesaid displacement of the second trigger.

9. In a lure a trigger fin projecting exteriorly of the lure from a rocking mounting within the lure such that when the trigger is pressed toward the lure an inner end portion is displaced in a certain direction; trigger-release means actuated by displacement of said inner end portion in said certain direction; and a second trigger fin projecting exteriorly of the lure from a pivotal mounting thereof on said inner end portion of the first trigger fin and acting when the exterior portions thereof are pressed toward the lure to bear against a fulcrum part within the lure to rock the inner end portion of the first trigger fin in said certain direction to actuate the trigger release also.

References Cited in the file of this patent

UNITED STATES PATENTS

| 1,355,858 | Smith | Oct. 19, 1920 |
| 1,644,884 | Johnson | Oct. 11, 1927 |
| 2,159,606 | Scogland | May 23, 1939 |
| 2,358,079 | Kirdler | Sept. 12, 1944 |

OTHER REFERENCES

Fishing Tackle Digest, First Annual Edition, 1946. 138 pages, published by Paul, Richmond & Co., 227 W. Washington St., Chicago 6, Ill. Page 118 cited.